(12) United States Patent
Chiu

(10) Patent No.: US 8,176,308 B2
(45) Date of Patent: *May 8, 2012

(54) METHOD FOR ACTIVATING A COMPUTER SYSTEM IN A LOW TEMPERATURE ENVIRONMENT

(75) Inventor: Chia-Chang Chiu, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 632 days.

This patent is subject to a terminal disclaimer.

(21) Appl. No.: 12/233,391

(22) Filed: Sep. 18, 2008

(65) Prior Publication Data

US 2010/0070745 A1 Mar. 18, 2010

(51) Int. Cl.
*G06F 9/00* (2006.01)
*G06F 15/177* (2006.01)
(52) U.S. Cl. .......................................................... 713/2
(58) Field of Classification Search ...................... 713/2
See application file for complete search history.

(56) References Cited

U.S. PATENT DOCUMENTS

| 5,640,171 | A * | 6/1997 | Shimada ............................ 345/8 |
| 6,169,930 | B1 * | 1/2001 | Blachek et al. ................. 700/79 |
| 2007/0146923 | A1 * | 6/2007 | Imai et al. ........................ 360/69 |
| 2008/0290813 | A1 * | 11/2008 | Greening et al. ............. 315/282 |
| 2008/0294295 | A1 | 11/2008 | Chiu |

FOREIGN PATENT DOCUMENTS

EP 1 403 754 A2 3/2004

\* cited by examiner

*Primary Examiner* — Mohammed Rehman

(57) ABSTRACT

A method for booting a computer system under a low temperature state is disclosed. When a trigger signal of a pressed power button on the computer system is detected, a hard disk temperature will be obtained via a temperature sensor to determine whether the hard disk temperature is less than a first predetermined temperature. If the hard disk temperature is less than the first predetermined temperature, a heater is activated to heat the hard disk and a low temperature event will be set. Next, if the hard disk temperature has reached or is greater than the second predetermined temperature, the computer system will be under activation. Then before a loading component of the computer system is activated, the low temperature event will be read. Therefore, output loading of the loading component is decreased to activate an system component of the computer system with a low loading state.

14 Claims, 2 Drawing Sheets

METHOD FOR ACTIVATING A COMPUTER SYSTEM IN A LOW TEMPERATURE ENVIRONMENT

BACKGROUND OF THE INVENTION

1. Field of the Invention

The invention relates to a booting technology of a computer system, and more particularly to a computer system and method for booting under low temperature state.

2. Description of the Related Art

Under a low temperature environment, a computer system (such as a notebook) usually cannot be normally activated, as discharge amount of a battery cell of the computer system under the low temperature environment is different from that under an atmospheric temperature environment. That is to say, during a booting process of the computer system, when activating a display panel or other hardware devices with high power consumption, if the power amount of the battery cell is insufficient, the computer system may suddenly shut down and be incapable of normal booting.

BRIEF SUMMARY OF THE INVENTION

Methods for booting a computer system under a low temperature state are provided. An exemplary embodiment of a method for booting a computer system under a low temperature state comprises the following. A power button of a computer system is detected to be pressed according to a trigger signal. A hard disk temperature is obtained via a temperature sensor of a hard disk of the computer system. It is determined whether the hard disk temperature is less than a first predetermined temperature. If the hard disk temperature is less than the first predetermined temperature, a heater of the hard disk is activated to heat the hard disk and a low temperature event is set. It is determined whether the hard disk temperature has reached a second predetermined temperature. If the hard disk temperature has reached or is greater than the second predetermined temperature, the computer system is activated, the low temperature event is read before a loading component of the computer system is activated, and output loading of the loading component is decreased to activate a computer system of the computer system with a low loading state.

Computer systems are provided. An exemplary embodiment of a computer system comprises a power button, a loading component, a hard disk, a controller, and a BIOS (Basic Input Output System). The hard disk is equipped with a heater and temperature sensor. The heater is activated to heat the hard disk when a hard disk temperature obtained via the temperature sensor is less than a first predetermined temperature. The controller detects whether the power button is pressed according to a trigger signal and if so, obtains a hard disk temperature via the temperature sensor, wherein when the hard disk temperature is less than the first predetermined temperature, the heater is activated to heat the hard disk and a low temperature event is set, and if the hard disk temperature has reached a second predetermined temperature, the computer system is activated. The BIOS reads the low temperature event upon starting activation of the computer system yet before activating a loading component of the computer system, and decreases output loading of the loading component to activate a system component of the computer system with a low loading state.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
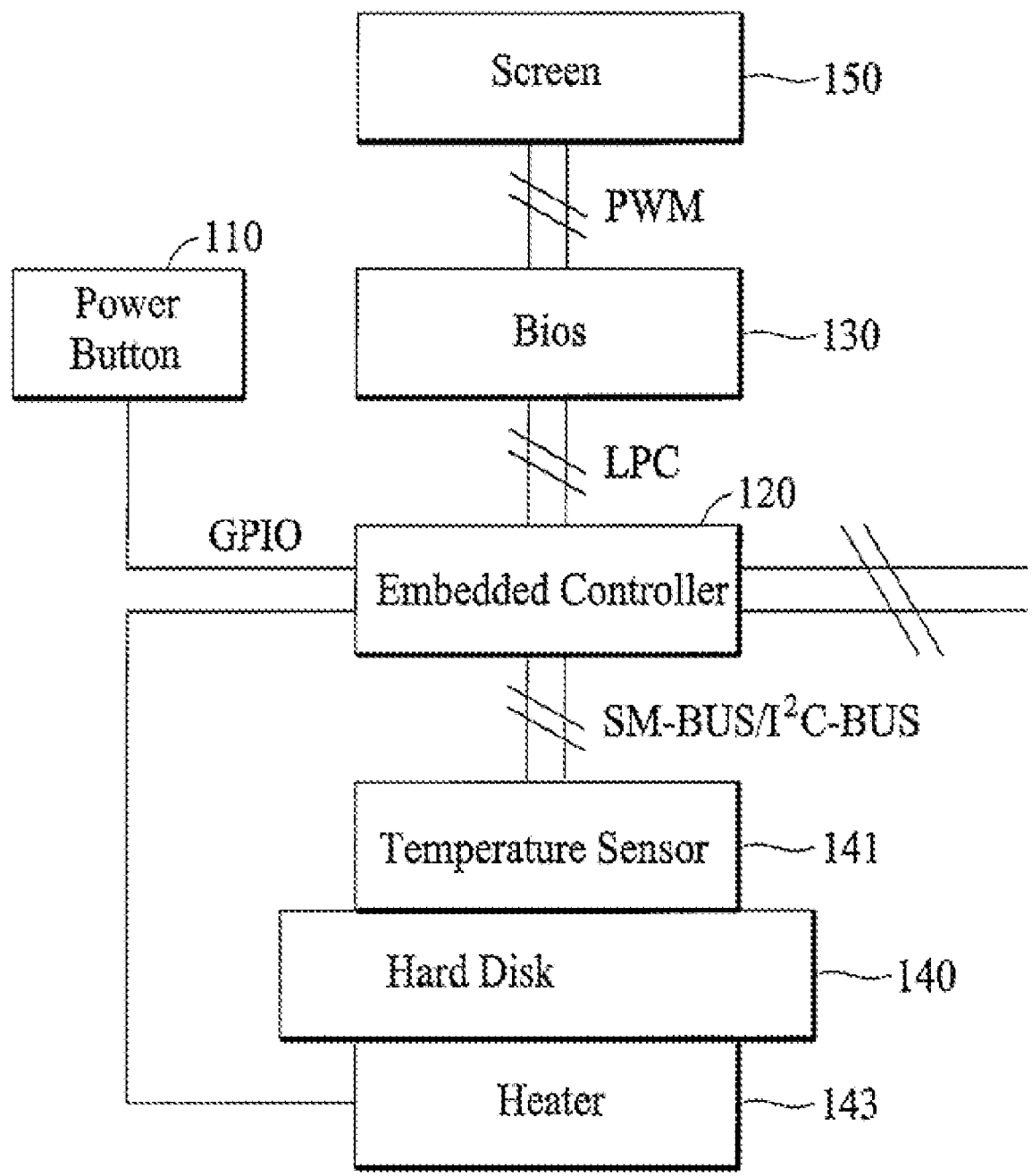
FIG. 1 is a schematic view of a computer system of the present invention.

Several exemplary embodiments of the invention are described with reference to FIGS. 1 through 2, which generally relate to booting a computer system under a low temperature state. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method for booting a computer system under a low temperature state and computer system using the same.

FIG. 1 is a schematic view of a computer system of the present invention.

An embodiment of a computer system comprises a power button 110, an embedded controller 120 (such as a keyboard controller (KBC)), a Basic Input/Output System (BIOS) 130, a hard disk 140, and a display device 150. The hard disk 140 is equipped with a temperature sensor 141 and a heater 143.

The described components are mutually connected via a General Purpose Input/Output (GPIO), Pulse Width Modulated (PWM), Low Pin Count (LPC) Bus, and System Management Bus (SM-BUS)/Inter-Integrated Circuit Bus ($I^2C$-BUS).

The embedded controller 120 detects whether the power button 110 has been pressed according to a trigger signal, and if so, obtains a hard disk temperature via the temperature sensor 141 from the hard disk 140, and determines whether the hard disk temperature is less than a first predetermined temperature (5° C., for example, i.e. an allowable temperature for power supply and activation of the computer system). If the hard disk temperature is not less than the first predetermined temperature (i.e. equal to or greater than 5° C.), a system component of the computer system is activated with a normal loading state. In the present invention, a system component is defined as an electrical component or hardware module that is essential for the normal operation of the computer system.

If the hard disk temperature is less than the first predetermined temperature, the embedded controller 120 activates the heater 143 of the hard disk 140 to heat the hard disk 140, sets a low temperature event (a power up event under low temperature), and then determines whether the hard disk temperature has reached a second predetermined temperature (5° C., for example, i.e. a preset bootable temperature).

If the hard disk temperature has not reached the second predetermined temperature, the heater 143 continuously heats the hard disk 140. If the hard disk temperature has reached or is greater than the second predetermined temperature, the embedded controller 120 activates the computer system and supplies power for the hard disk 140. The BIOS 130 reads the low temperature event, upon starting activation of the computer system yet before activating at least one loading component of the computer system, and decreases output loading of the loading component (for example, adjusting the display device 150 as low brightness) to activate the system component of the computer system with a low loading state.

It noted that the display device 150 represents a loading component in this embodiment but is not limited thereto. In addition, to decrease the output loading of the display device 150, output loadings of other loading components can also be decreased to activate the system component of the computer system with a low loading state.

Figure 2:
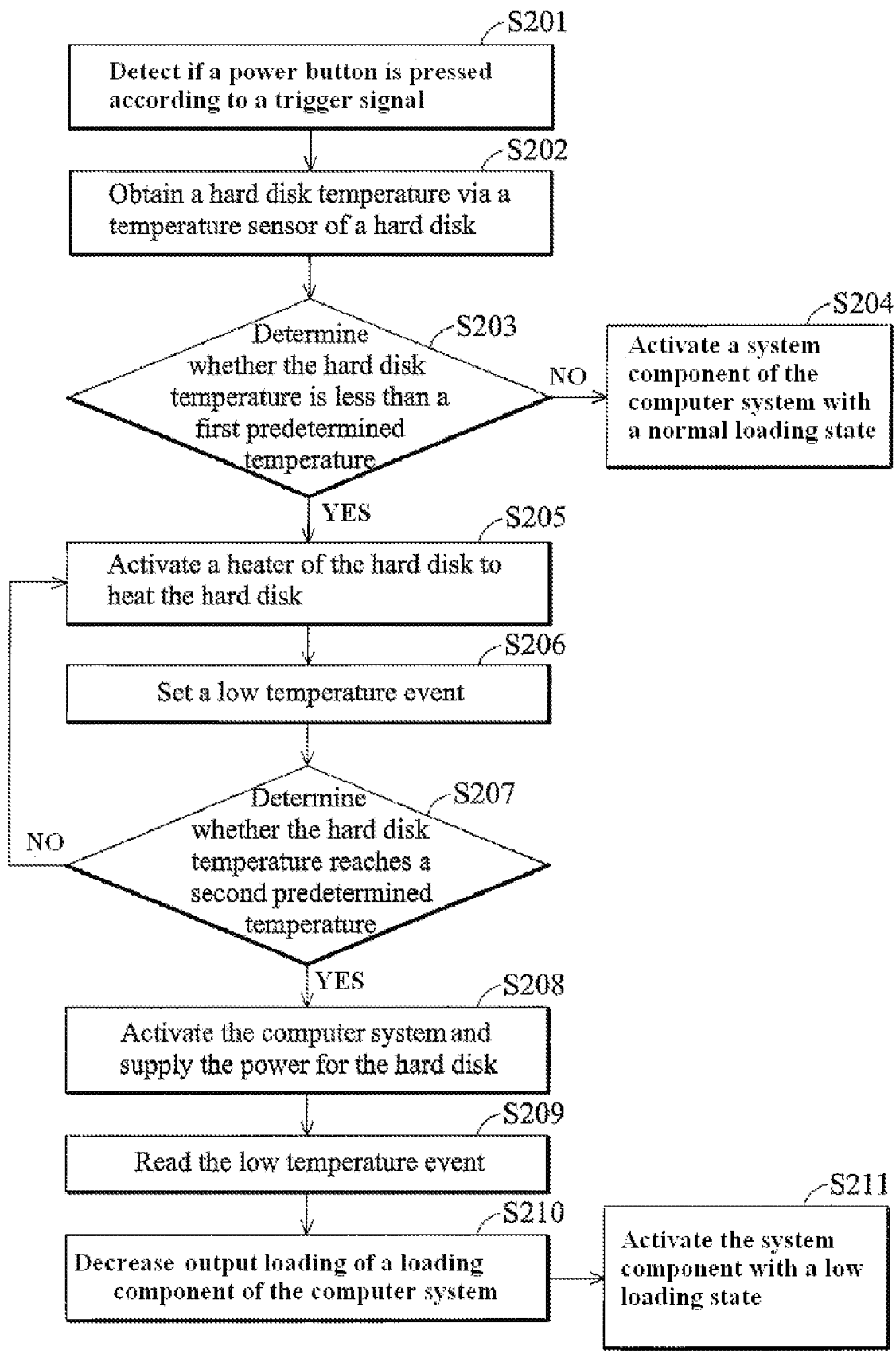
FIG. 2 is a flowchart of a method for booting a computer system under a low temperature state of the present invention.

FIG. 2 is a flowchart of a method for booting a computer system under a low temperature state of the present invention.

A power button of a computer system is detected as being pressed according to a trigger signal (step S201). A hard disk temperature is obtained via a temperature sensor of a hard disk of the computer system (step S202). It is determined whether the hard disk temperature is less than a first predetermined temperature (5° C., for example, i.e. an allowable temperature for power supply and activation of the computer system) (step S203). If the hard disk temperature is not less than the first predetermined temperature (i.e. equal to or greater than 5° C.), an system component of the computer system is activated with a normal loading state (step S204).

If the hard disk temperature is less than the first predetermined temperature, a heater of the hard disk is activated to heat the hard disk (step S205) and a low temperature event is set (step S206). Next, it is determined whether the hard disk temperature has reached a second predetermined temperature (5° C., for example, i.e. a preset bootable temperature) (step S207). The second predetermined temperature can be identical of different from the first predetermined temperature, for example, greater than the first predetermined temperature. If the hard disk temperature has not reached the second predetermined temperature, the hard disk is continuously heated using the heater of the hard disk (step S205). If the hard disk temperature has reached or is greater than the second predetermined temperature, the computer system is activated and the power is supplied to the hard disk (step S208), while the low temperature event is read (step S209) (yet before activating a loading component of the computer system) and output loading of the loading component is decreased (for example, adjusting a display device of the computer system to a low brightness) (step S210) to activate the system component of the computer system with a low loading state (step S211).

An embodiment of the method for booting a computer system under a low temperature state detects the hard disk temperature using a keyboard controller and activates a heater, when under the low temperature state, to heat the hard disk and then activate an system component. Further, before a display device of a computer system is upon starting activation, the BIOS retrieves the low temperature event (Power Up Event) before activating at least one loading component of the computer system to determine whether the booting event is implemented normally or with a low temperature state. If the computer system is determined to have been activated with a low temperature state, the BIOS decreases output loading of the loading component(s) of the computer system and then activates an system component of the computer system. In this embodiment, the "low temperature state" indicates that the keyboard controller sends a low temperature event to the BIOS when a power button is pressed to activate the computer system when a temperature of a battery cell of the computer system less than 5° C.

In this embodiment, decreasing output loading of, which is not limited to, a single loading component of the computer system indicates decreased performance of a loading component with high power consumption or even not supply power to the loading component. Generally, a display device of a basic computer system consumes a lot of power, relatively. Thus, the example of a display device first being adjusted to a low brightness is used in this embodiment.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for booting a computer system under a low temperature state, the computer system comprising at least one system component having a loading component, the method comprising:
   detecting whether a power button of the computer system has been pressed according to a trigger signal;
   obtaining a hard disk temperature via a temperature sensor of a hard disk of the computer system;
   determining whether the hard disk temperature is less than a first predetermined temperature;
   when the hard disk temperature is less than the first predetermined temperature, performing the steps of:
      activating a heater of the hard disk to heat the hard disk; and
      setting a low temperature event; and
      activating the computer system when the hard disk temperature has reached or is greater than a second predetermined temperature;
   upon activation of the computer system and before activation of the loading component of the system component, reading the low temperature event; and
   decreasing output loading of the loading component and then activating the system component of the computer system with a lowered loading state when the low temperature event has been set.

2. The method of claim 1 further comprising activating the system component of the computer system with a normal loading state if the hard disk temperature is not less than the first predetermined temperature.

3. The method of claim 1 further comprising continuously heating the hard disk by the heater if the hard disk temperature has not reached the second predetermined temperature.

4. The method of claim 1, wherein the step of decreasing the output loading of the loading component comprises a step of adjusting the brightness of a display device of the computer system to a low brightness.

5. The method of claim 1, wherein the second predetermined temperature is equal to the first predetermined temperature.

6. The method of claim 1, wherein the second predetermined temperature is greater than the first predetermined temperature.

7. A computer system, comprising:
 a power button;
 at least one system component comprising a loading component;
 a hard disk, equipped with a heater and temperature sensor;
 a controller, detecting whether the power button is pressed according to a trigger signal, and if so, obtaining a hard disk temperature via the temperature sensor, configured such that when the hard disk temperature is less than a first predetermined temperature, the heater is activated to heat the hard disk and a low temperature event is set, and when the hard disk temperature has reached a second predetermined temperature, the computer system is activated; and
 a BIOS (Basic Input/Output System), reading the low temperature event upon starting activation of the computer system and before activating the loading component of the system component, and decreasing output loading of the loading component and then activating the system component of the computer system with a lowered loading state when the temperature event has been set.

8. The computer system of claim 7, wherein the controller activates the system component of the computer system with a normal loading state if the hard disk temperature is not less than the first predetermined temperature.

9. The computer system of claim 7, wherein the heater continuously heats the hard disk if the temperature sensor detects that the hard disk temperature has not reached the second predetermined temperature.

10. The computer system of claim 7, wherein the loading component is a display device of the computer system and the brightness of the display device is adjusted as a low brightness.

11. A non-transitory computer-readable medium encoded with computer executable instructions for booting a computer system under a low temperature state, the computer system comprising at least one system component having a loading component, wherein the computer executable instructions comprise:
 detecting whether a power button of a computer system is pressed according to a trigger signal;
 when a power button of a computer system has been pressed according to a trigger signal, obtaining a hard disk temperature via a temperature sensor of a hard disk of the computer system;
 determining whether the hard disk temperature is less than a first predetermined temperature;
 when the hard disk temperature is less than the first predetermined temperature, performing the steps of:
  activating a heater of the hard disk to heat the hard disk;
  setting a low temperature event;
  activating the computer system when the hard disk temperature has reached or is greater than a second predetermined temperature;
 upon activation of the computer system and before activation of the loading component of the system component, reading the low temperature event; and
 decreasing output loading of the loading component and then activating the system component of the computer system with a lowered loading state when the low temperature event has been set.

12. The computer-readable medium of claim 11, further comprising activating the system component of the computer system with a normal loading state if the hard disk temperature is not less than the first predetermined temperature.

13. The computer-readable medium of claim 11, further comprising continuously heating the hard disk using the heater of the hard disk if the hard disk temperature has not reached the second predetermined temperature.

14. The computer-readable medium of claim 11, wherein decreasing the output loading of the loading component comprises adjusting the brightness of a display device of the computer system to a low brightness.

* * * * *